United States Patent [19]

Kühbauch

[11] Patent Number: 4,866,811
[45] Date of Patent: Sep. 19, 1989

[54] WIPING DEVICE FOR PANES OF POWER VEHICLES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 235,326

[22] Filed: Aug. 22, 1988

[30] Foreign Application Priority Data

Sep. 23, 1987 [DE] Fed. Rep. of Germany ....... 3731922

[51] Int. Cl.$^4$ .............................................. B60S 1/32
[52] U.S. Cl. .............................. 15/250.19; 15/250.16
[58] Field of Search ........... 15/250.16, 250.17, 250.19, 15/250.2, 250.34

[56] References Cited

U.S. PATENT DOCUMENTS 2,784,438  3/1957  Petersen ........................... 15/250.19

FOREIGN PATENT DOCUMENTS 880864  7/1949  Fed. Rep. of Germany ... 15/250.19
2326251  12/1974  Fed. Rep. of Germany ... 15/250.19

Primary Examiner—Peter Feldman
Attorney, Agent, or Firm—Michael J. Striker

[57] ABSTRACT

A wiping device for panes of power vehicles comprises a swingingly movable wiper arm which includes a first wiper arm part holding a swinging shaft and a second wiper arm part provided with a wiping element arranged to abut against a pane, and a hinge connecting the wiper arm parts with one another and having an axis extending approximately in a swinging direction, a unit for turning the second wiper arm part away of the pane so that the wiping element located in a parking position is unloaded, the unit including an electric motor having a drive shaft, and a lifting element operatively connected with the drive shaft and arranged so that it cooperates with the wiping element and the upper arm which together form a wiper lever when the motor is activated.

8 Claims, 1 Drawing Sheet

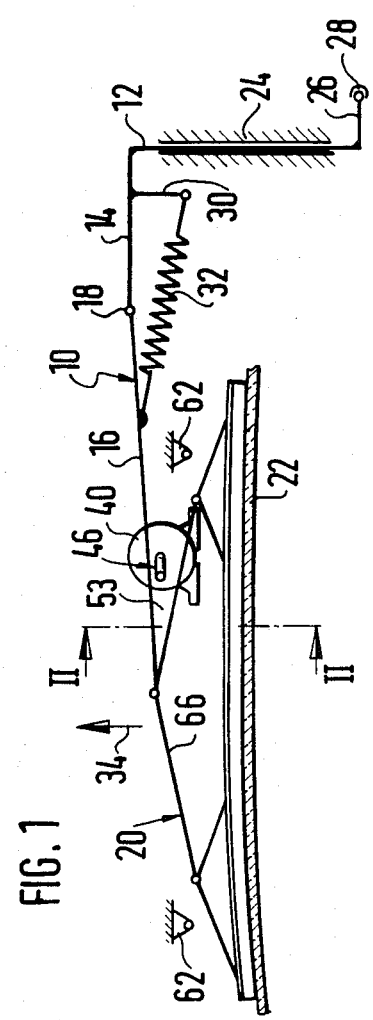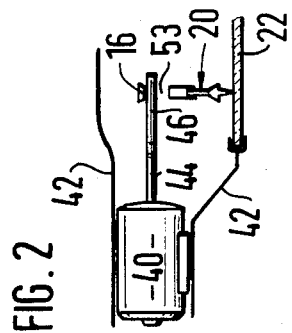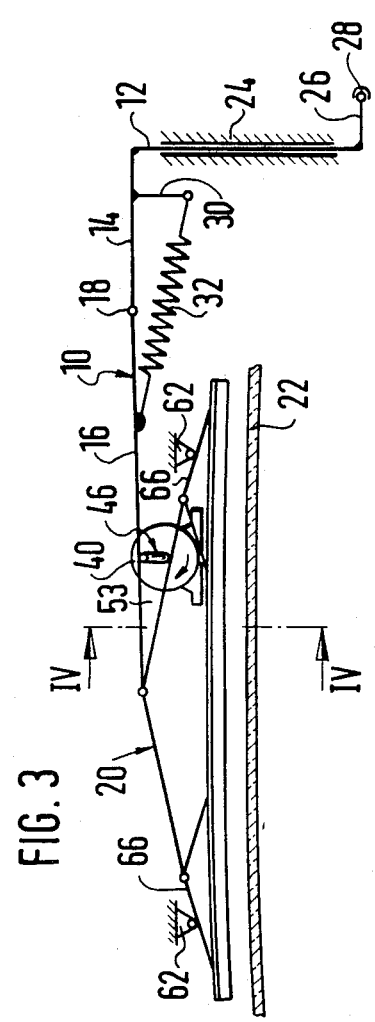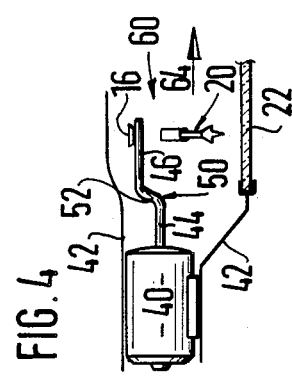

WIPING DEVICE FOR PANES OF POWER VEHICLES

BACKGROUND OF THE INVENTION

The present invention relates to a wiping device for wiping panes of power vehicles.

In all conventional pane wiping devices a wiping element is pressed against a pane to be wiped not only during the operation but also in the rest position in a springy manner. Predominantly very thin wiping lips of the wiping element abut against the pane to be wiped also with the immovable wiping device. This has the disadvantage that after a certain time the wiping lip which is produced of an elastic material, for example rubber, obtains a permanent deformation. A thorough cleaning of the pane with such a wiping element is no longer possible.

For eliminating this disadvantage of known wiping devices, means were provided which unload the wiping element in parking position. Such a wiping device is disclosed for example in German Patent No. 880,864. Here the above mentioned means include a roller which is supported on a wiping element-side wiper arm part, and a control curve which is arranged on the swinging (pendulum) shaft bearing. The roller abuts with a pretensioning against the control curve and in correspondence with the curve shape of the wiping element-side wiper arm part turns together with the wiping element somewhat perpendicularly to the outer surface of the pane about a hinge. The control curve must be formed so that an unloading of the wiping element can be performed only outside of the wiping field. This known construction is therefore not possible for wiping devices in which the wiping element is taken off in a so-called extended parking position in which the wiping element is automatically transferred with stopping of the wiping device.

SUMMARY OF THE INVENTION

Accordingly, it is an object of the present invention to provide a wiping device of the above mentioned general type which avoids the disadvantages of the prior art.

More particularly, it is an object of the present invention to provide a wiping device of the above mentioned general type, in which a parking position of the wiping element is identical with a swinging return position of the wiping element.

In keeping with these objects and with others which will become apparent hereinafter, one feature of the present invention resides, briefly stated, in a wiping device in which means for turning a second wiper arm part from a pane to unload a wiping element in a parking position includes an electric motor with a drive shaft which is in working connection with a lifting element, and when the motor is activated the lifting element cooperates with a wiping lever which is composed of a wiping element and a wiper arm.

When the wiping device is formed in accordance with the present invention, a parking position of the wiping element becomes identical with a swinging return position of the wiping element.

Another feature of the present invention is that the lifting element includes a structural member which is connected with the drive shaft and is arranged eccentrically relative to the shaft, and during the wiping operation the structural member engages in an intermediate space formed between the wiping lever and a pane, so that in a rest position the eccentric axis of the structural member is located close to the pane.

Still another feature of the present invention is that a distance between the axis of rotation of the drive shaft of the motor and the eccentric axis of the structural member is greater than a distance between the structural member in its rest position and the region of the wiper lever which faces away of the pane and cooperates with the structural member.

The structural member can be formed as a bent end portion of the drive shaft of the motor.

The lifting element can cooperate with the wiper arm which carries the wiping element.

The lifting element can also be arranged fixed in place on a vehicle body in the region of the parking position of the wiping element.

The wiping element can be formed as a multi-part supporting frame and come to abutment against a body-fixed support before the lifting element ends its lifting movement.

Finally, the lifting element and the support can be arranged in a parking shaft of the vehicle body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a wiping device in accordance with the present invention, which is located in a working position;

FIG. 2 is a view showing a portion of the wiping device of FIG. 1, in a section taken along the line II—II;

FIG. 3 is a view showing the wiping device in accordance with the present invention in a rest position; and FIG. 4 is a partial view showing a section of the wiping device of FIG. 3, in a section taken along the line IV—IV.

DESCRIPTION OF A PREFERRED EMBODIMENT

A wiping device shown in FIG. 1 has a swingingly driven wiper arm 10. It has a first wiper arm part 14 which is fixedly connected with a swinging shaft 12, and a second wiper arm part 16 which is connected with its one end to the wiper arm part 14 through a hinge 18. A wiper member 20 is arranged on the opposite free end of the wiper arm part 16 and abuts against a pane 22 to be wiped.

The plane in which the wiper arm 10 together with the wiping element 20 swing is arranged so that it stands on the plane of the drawing. This is also true for the axis of the hinge 18. The wiper shaft 12 is guided in a wiper bearing 24 which is fixedly connected with the frame. The wiper shaft 12 has an end which faces away of the wiper arm 10 and extends outwardly beyond the wiper bearing 24. This end is provided with a rocker 26. A displacement rod which is a part of a known swinging drive is articulately connected with the rocker 26 through a spherical hinge 28.

A pulling spring 32 is connected with is one end to the wiper arm part 14 through a support 30. It has another end which is held on the wiper arm part 16. The pulling spring 32 is pre-tensioned so that the wiping member 20 is pressed through the wiper arm part 16 against the pane 22 to be wiped. A wiping device has a unit which can lift the wiper lever located in its parking position and composed of the wiper arm 10 and the wiping element 20, against the abutment force of the pulling spring 32 and from the pane 22. Thereby the wiper arm part 16 together with the wiping member 20 is turned in direction of the arrow 34 about the hinge 18 to a lifting position shown in FIG. 3. The lifting unit includes an electric motor 40 which is fixedly connected with a vehicle body 42. A lifting element 46 is connected with a drive shaft 44 of the electric motor and cooperates with the wiping lever which is composed of the wiping member 20 and the wiper arm 10, when the motor 40 is activated.

The lifting element 46 includes a crank-like member 50 which is made in the shown example by a band 52 of the motor shaft 44. The crank 50 forms a structural member which is arranged eccentrically to the drive shaft 44. During the wiping operation of the wiping device, the crank 50 is positioned so that it extends without difficulties into an intermediate space 53 between the wiper arm 10 and the wiping element 20 without interfering with the swinging movement of the wiping lever. When the wiping device is stopped and the wiping member 20 must be lifted from the pane 22, the electric motor 40 is activated and the crank 50 is turned so that it cooperates with the wiper arm part 16 of the wiper arm 10 and the wiping element 20. Thereby the crank 50 turns from its rest position which is shown in FIGS. 1 and 2 and is close to the pane 22, to a position in which the crank 50 reaches a great distance from the pane 22 as shown in FIGS. 3 and 4.

Since the distance between the axis of rotation of the drive shaft 44 and the eccentric axis of the lifting element 46 is greater than the distance between the lifting element 46 located in the rest position in FIG. 1 and the region of the wiper lever part 16 which is located at the side facing away of the pane 22 and cooperates with the lifting element 46, the wiping lever and thereby the wiping member 20 is lifted from the pane 22 by a certain value as shown in FIG. 4. It is believed to be clear that for this purpose the lifting unit 40, 44, 46 must be arranged fixed in place relative to the vehicle body 42 in the region of the abutment position of the wiping element 10. As shown especially in FIGS. 2 and 4, the lifting unit 40, 44, 46 is located in a shaft 60 provided in the vehicle body 42.

For lifting the wiping element without too long stroke completely from the pane 22 in the event of strongly curved panes, two supports 62 are arranged in the shaft 60 fixedly with the vehicle body. The supports 62 cooperate with a multi-part supporting bracket frame 66, before the crank 46 reaches its maximum lifting position shown in FIGS. 3 and 4. Thereby the wiping element 20 also during its lifting position is bent so that it corresponds to the curvature of the pane 22. When the wiping device must be brought into operation, it should be switched on so that the wiper lever moves in direction of the arrow 64 in FIG. 4. The wiper lever springs from the eccentric crank 46 and the wiping element 20 again abuts with a respective pre-tensioning on the pane 22 to be wiped. It is clear that the crank 46 must be again brought to a position in which it again penetrates into the space 52 when the wiper lever performs its first reciprocating movement.

The control of the electric motor 40 can be performed either by a not shown wiper motor or through the ignition of the vehicle. The electric motor 40 is formed as a so-called stepper motor, performing a partial rotary movement which can be rotating movement or swinging movement.

It will be understood that each of the elements described above, or two or more together, may also find a useful application in other types of constructions differing from the types described above.

While the invention has been illustrated and described as embodied in a wiping device for panes of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wiping device for panes of power vehicles, comprising a swingingly movable wiper arm which includes a first wiper arm part holding a swinging shaft and a second wiper arm part provided with a wiping element arranged to abut against a pane, and a hinge connecting said wiper arm parts with one another and having an axis extending approximately in a swinging direction; means for turning said second wiper arm part away of the pane so that said wiping element located in a parking position is unloaded, said means including an electric motor having a drive shaft, and a lifting element operatively connected with said drive shaft and arranged so that it cooperates with said wiping element and said wiper arm which together form a wiper lever, when said motor is activated, said lifting element including a structural member which is connected with said drive shaft and arranged eccentrically relative to the latter, said wiper lever forming an intermediate space with a pane, said structural member engaging into the space during a wiping operation.

2. A wiping device as defined in claim 1, in said structural element has an eccentric axis which is located in a rest position close to a pane.

3. A wiping device as defined in claim 2, wherein said drive shaft of said electric motor has an axis of rotation, said wiper lever having a region which faces away of a pane and cooperates with said structural member, said axis of rotation of said drive shaft being spaced from said eccentric axis of said structural member by a distance which is greater than a distance between said structural member located in said rest position and said region of said wiper lever.

4. A wiping device as defined in claim 1, wherein said drive shaft of said motor having an end portion which is bent, said structural member being formed by said bent end portion of said drive shaft.

5. A wiping device as defined in claim 1, wherein said lifting element cooperates with said second wiping arm part which carries said wiping element.

6. A wiping device for panes of power vehicles, comprising a swingingly movable wiper arm which includes a first wiper arm part holding a swinging shaft and a second wiper arm part provided with a wiping element arranged to abut against a pane, and a hinge connecting said wiper arm parts with one another and having an axis extending approximately in a swinging direction; means for turning said second wiper arm part away of the pane so that said wiping element located in a parking position is unloaded, said means including an electric motor having a drive shaft, and a lifting element operatively connected with said drive shaft and arranged so that it cooperates with said wiping element and said wiper arm which together form a wiper lever, when said motor is activated, said lifting element being arranged fixed in place on a vehicle body in the region of a parking of said wiping element against a pane.

7. A wiper device for panes of power vehicles, comprising a swingingly movable wiper arm which includes a first wiper arm part holding a swinging shaft and a second wiper arm part provided with a wiping element arranged to abut against a pane, and a hinge connecting said wiper arm parts with one another and having an axis extending approximately in a swinging direction; means for turning said second wiper arm part away of the pane so that said wiping element located in a parking position is unloaded, said means including an electric motor having a drive shaft, and a lifting element operatively connected with said drive shaft and arranged so that it cooperates with said wiping element and said wiper arm which together form a wiper lever, when said motor is activated, said wiping element having a multi-part supporting bracket frame which has a side facing away of a pane; and at least one support which is fixed on a vehicle body and arranged at said side in the region of a parking position of said wiping element, said supporting bracket frame coming to abutment against said fixed support before said lifting element ends its lifting movement.

8. A wiping device as defined in claim 7; and further comprising means forming a shaft in a vehicle body, said lifting element and said support being arranged in said shaft.

* * * * *